(12) United States Patent
Tokizaki

(10) Patent No.: US 12,367,908 B2
(45) Date of Patent: Jul. 22, 2025

(54) DISK DEVICE WITH COVER DAMPING CONFIGURATION

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tomoyuki Tokizaki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/590,756

(22) Filed: Feb. 28, 2024

(65) Prior Publication Data

US 2025/0095676 A1 Mar. 20, 2025

(30) Foreign Application Priority Data

Sep. 20, 2023 (JP) ................. 2023-152223

(51) Int. Cl.
| | |
|---|---|
| G11B 33/08 | (2006.01) |
| G11B 5/55 | (2006.01) |
| G11B 25/04 | (2006.01) |
| G11B 33/02 | (2006.01) |
| G11B 33/12 | (2006.01) |

(52) U.S. Cl.
CPC ............ *G11B 33/08* (2013.01); *G11B 5/5573* (2013.01); *G11B 25/043* (2013.01); *G11B 33/027* (2013.01); *G11B 33/121* (2013.01); *G11B 33/123* (2013.01)

(58) Field of Classification Search
None
See application file for complete search history.

(56) References Cited

U.S. PATENT DOCUMENTS

| | | | | |
|---|---|---|---|---|
| 5,214,549 A | | 5/1993 | Baker et al. | |
| 5,781,373 A | * | 7/1998 | Larson et al. | ......... G11B 33/08 |
| | | | | 360/99.19 |
| 5,999,374 A | * | 12/1999 | Kim | ....................... G11B 33/08 |
| | | | | 360/264.7 |

(Continued)

FOREIGN PATENT DOCUMENTS

JP 7159094 10/2022

*Primary Examiner* — Craig A. Renner
(74) *Attorney, Agent, or Firm* — Knobbe, Martens, Olson & Bear, LLP

(57) ABSTRACT

A disk device according to one embodiment includes a base, a first cover, a second cover, and a damper. The base includes a bottom surface, a side wall protruding in a first direction from the bottom surface, and a support surface located at an end of the side wall in the first direction. The first cover is attached to the base to close the inner space. The second cover is joined to the base while being supported by the support surface, to cover the first cover. The damper includes a constrained layer in-between the first cover and the second cover and a viscoelastic material between the first cover and the constrained layer. The constrained layer includes a smaller-thickness part extending along the support surface and a larger-thickness part connected to the smaller-thickness part.

16 Claims, 6 Drawing Sheets

(56) References Cited

U.S. PATENT DOCUMENTS

| | | | | |
|---|---|---|---|---|
| 6,229,668 B1* | 5/2001 | Huynh et al. | .......... | G11B 33/08 360/97.19 |
| 6,529,345 B1* | 3/2003 | Butler et al. | .......... | G11B 33/08 360/99.18 |
| 6,536,555 B1* | 3/2003 | Kelsic et al. | .......... | G11B 33/08 720/651 |
| 6,690,540 B2 | 2/2004 | Hirasaka et al. | | |
| 6,757,131 B1 | 6/2004 | Iwahara et al. | | |
| 6,952,323 B2* | 10/2005 | Hirasaka et al. | ...... | G11B 33/08 360/99.18 |
| 6,954,328 B2* | 10/2005 | Daniel et al. | .......... | G11B 33/08 360/99.19 |
| 7,283,323 B2* | 10/2007 | Lee | ........................ | G11B 33/08 360/97.19 |
| 7,643,243 B2* | 1/2010 | Lee et al. | ................ | G11B 33/08 360/97.19 |
| 7,876,528 B2* | 1/2011 | Uefune et al. | ....... | G11B 25/043 360/97.22 |
| 7,957,092 B2* | 6/2011 | Ichikawa et al. | .... | G11B 25/043 360/99.2 |
| 8,248,724 B2* | 8/2012 | Hayakawa et al. | .. | G11B 25/043 360/97.22 |
| 9,786,330 B1* | 10/2017 | Usami et al. | ........ | G11B 33/027 |
| 2005/0099734 A1* | 5/2005 | Rafaelof | .............. | G11B 33/121 360/97.19 |
| 2013/0222947 A1* | 8/2013 | Sugii et al. | .......... | G11B 33/027 360/99.08 |
| 2022/0084558 A1* | 3/2022 | Akatsuka et al. | ... | G11B 25/043 |

* cited by examiner

DISK DEVICE WITH COVER DAMPING CONFIGURATION

CROSS-REFERENCE TO RELATED APPLICATIONS

This application is based upon and claims the benefit of priority from Japanese Patent Application No. 2023-152223, filed on Sep. 20, 2023; the entire contents of which are incorporated herein by reference.

FIELD

Embodiments described herein relate generally to a disk device.

BACKGROUND

Disk devices such as a hard disk drive (HDD) typically include magnetic disks, magnetic heads that read and write information from and to the corresponding magnetic disks, and a housing that accommodates various parts and components. Some type of disk devices includes a housing with a base, a first cover that closes an inner space of the base, and a second cover that covers the first cover.

Such a disk device may further include a damper made of a viscoelastic material that deforms to attenuate vibration. The damper is attached to the first cover, for example, in-between the first cover and the second cover.

The dimensions of the disk device are subject to constraints according to various conditions. Such constrains may cause difficulty in the design of the disk device in terms of placement of the damper having a desired size in-between the first cover and the second cover, for example.

DETAILED DESCRIPTION

In general, according to one embodiment, a disk device includes magnetic disks, a base, a first cover, a second cover, and a damper. The base is provided with an inner space in which the magnetic disk is disposed. The base includes a bottom surface, a side wall, and a support surface. The bottom surface faces the magnetic disk. The side wall protrudes in a first direction from the bottom surface, to surround the magnetic disk. The support surface is located at an end of the side wall in the first direction. The inner space is defined by the bottom surface and the side wall. The first cover is attached to the base to close the inner space. The second cover is joined to the base while being supported by the support surface, to cover the first cover. The damper includes a constrained layer and a viscoelastic material. The constrained layer is disposed in-between the first cover and the second cover. The viscoelastic material is interposed between the first cover and the constrained layer. The constrained layer includes a smaller-thickness part and a larger-thickness part. The smaller-thickness part extends along the support surface. The larger-thickness part is thicker than the smaller-thickness part in the first direction and connected to the smaller-thickness part.

Hereinafter, one embodiment will be described with reference to FIGS. 1 to 6. Note that, in the present specification, components according to embodiments and description of the components may be described in a plurality of expressions. The components and the description thereof are examples and are not limited by the expression of the present specification. The components may also be specified with names different from those used herein. In addition, the components may be described by an expression different from the expressions used herein.

In the following description, to "suppress" is defined as, for example, to prevent occurrence of an event, an action, or an influence or to reduce the degree of an event, an action, or an influence.

Figure 1:
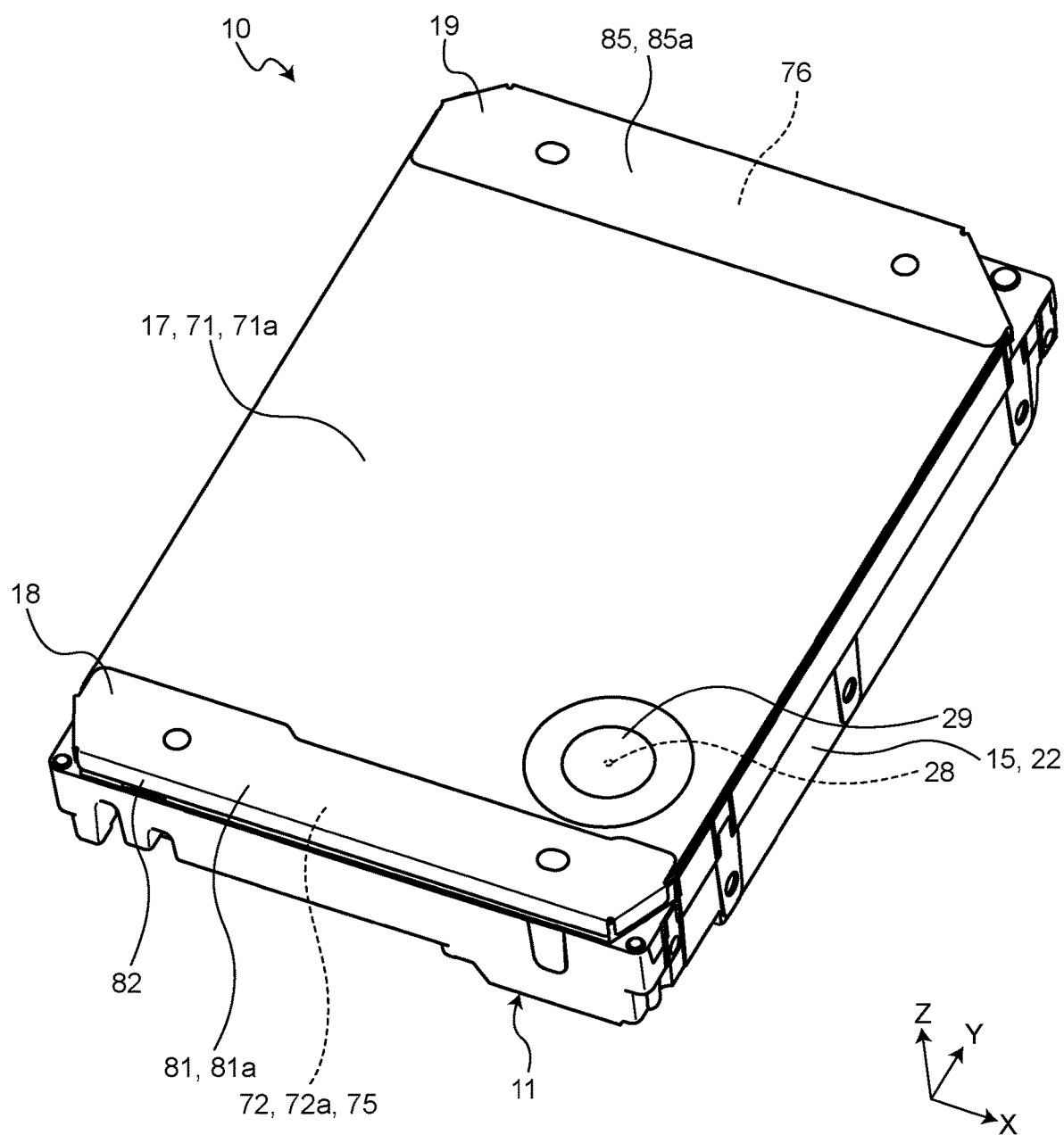
FIG. 1 is an exemplary perspective view illustrating an HDD according to one embodiment.

FIG. 1 is an exemplary perspective view illustrating a hard disk drive (HDD) 10 according to an embodiment. The HDD 10 is an example of a disk device and may also be referred to as an electronic device, a storage device, an external storage device, or a magnetic disk device. The HDD 10 includes a housing 11 that accommodates various parts.

As illustrated in the drawings, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

Figure 2:
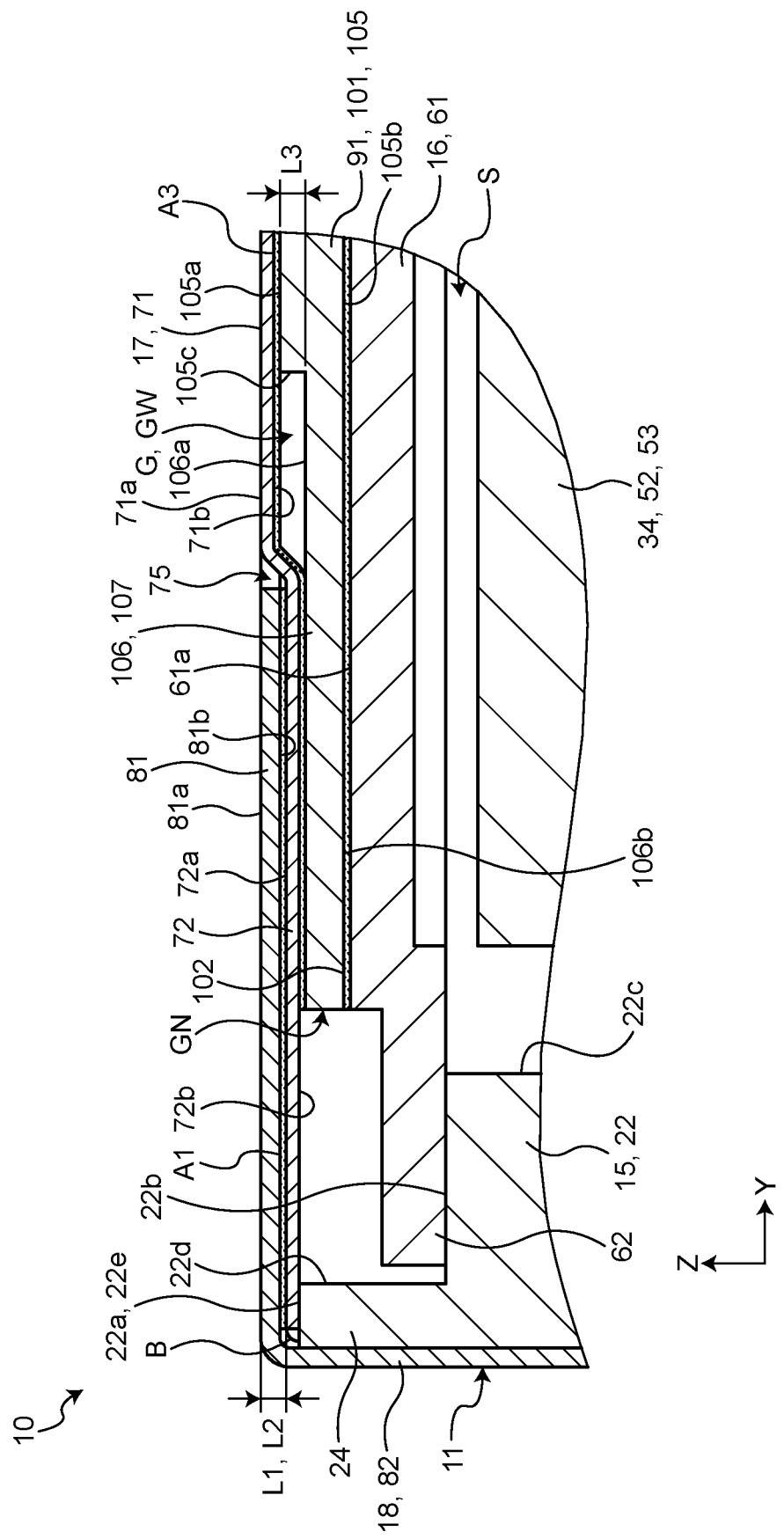
FIG. 2 is an exemplary cross-sectional view schematically illustrating one end of the HDD of the embodiment.

FIG. 2 is an exemplary cross-sectional view schematically illustrating an end of the HDD 10 in the −Y direction of the present embodiment. As illustrated in FIG. 2, the housing 11 includes a base 15, an inner cover 16, an outer cover 17, and a protector 18. The inner cover 16 is an example of the first cover. The outer cover 17 is an example of the second cover. The protector 18 is an example of a third cover and may also be referred to as a protect cover.

Figure 3:
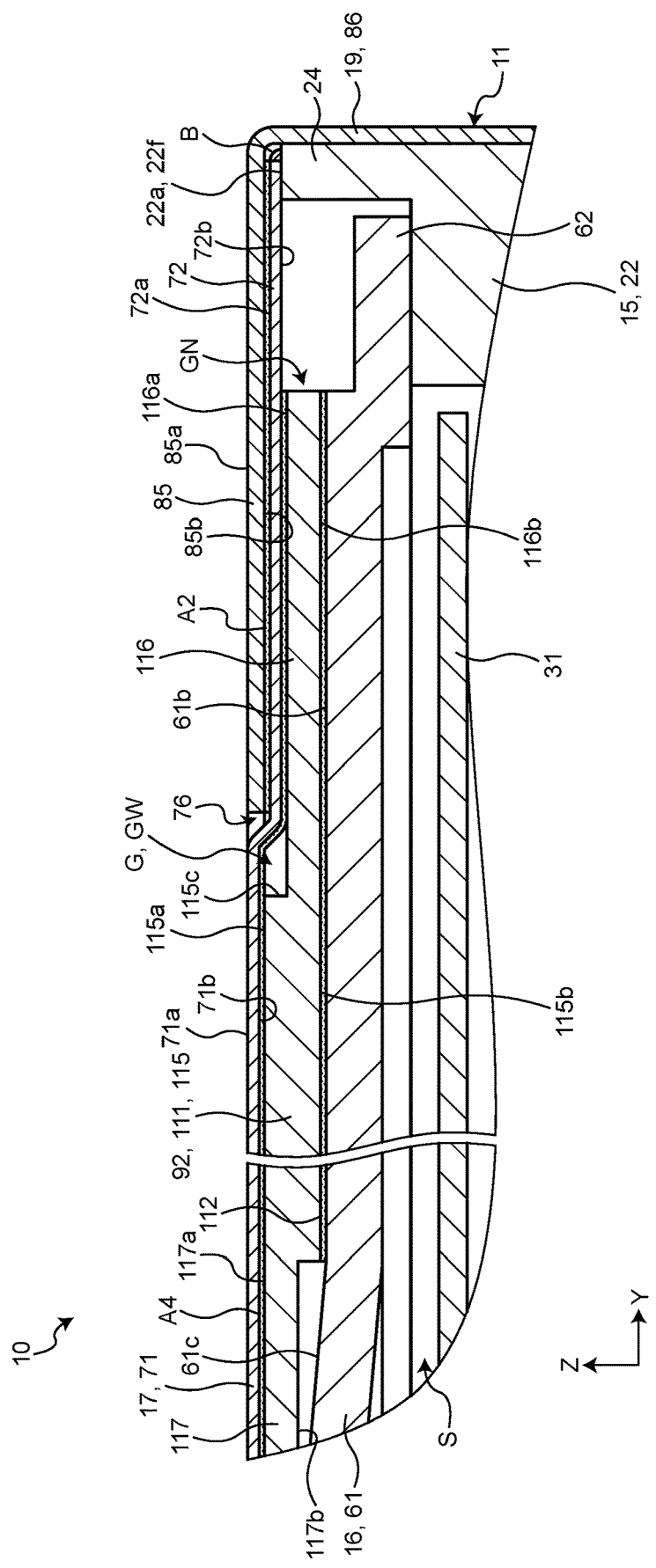
FIG. 3 is an exemplary cross-sectional view schematically illustrating another end of the HDD of the embodiment.

FIG. 3 is an exemplary cross-sectional view schematically illustrating an end of the HDD 10 in the +Y direction of the present embodiment. As illustrated in FIG. 3, the housing 11 further includes a protector 19. The protector 19 is also an example of the third cover. Note that the protectors 18 and 19 may be omitted in the housing 11.

The base 15 and the outer cover 17 are made of metal such as an aluminum alloy, for example. The inner cover 16, the protector 18, and the protector 19 are made of metal such as non-magnetic stainless steel. That is, the base 15, the inner cover 16, the outer cover 17, the protector 18, and the protector 19 are non-magnetic bodies. Note that the base 15, the inner cover 16, the outer cover 17, the protector 18, and the protector 19 may be made of other materials or may be ferromagnetic.

The base 15 is a bottomed container that opens in the +Z direction. As illustrated in FIG. 1, the base 15 extends in the Y direction. In other words, the length of the base 15 in the Y direction is longer than the length of the base 15 in the X direction and is longer than the length of the base 15 in the Z direction.

Figure 4:
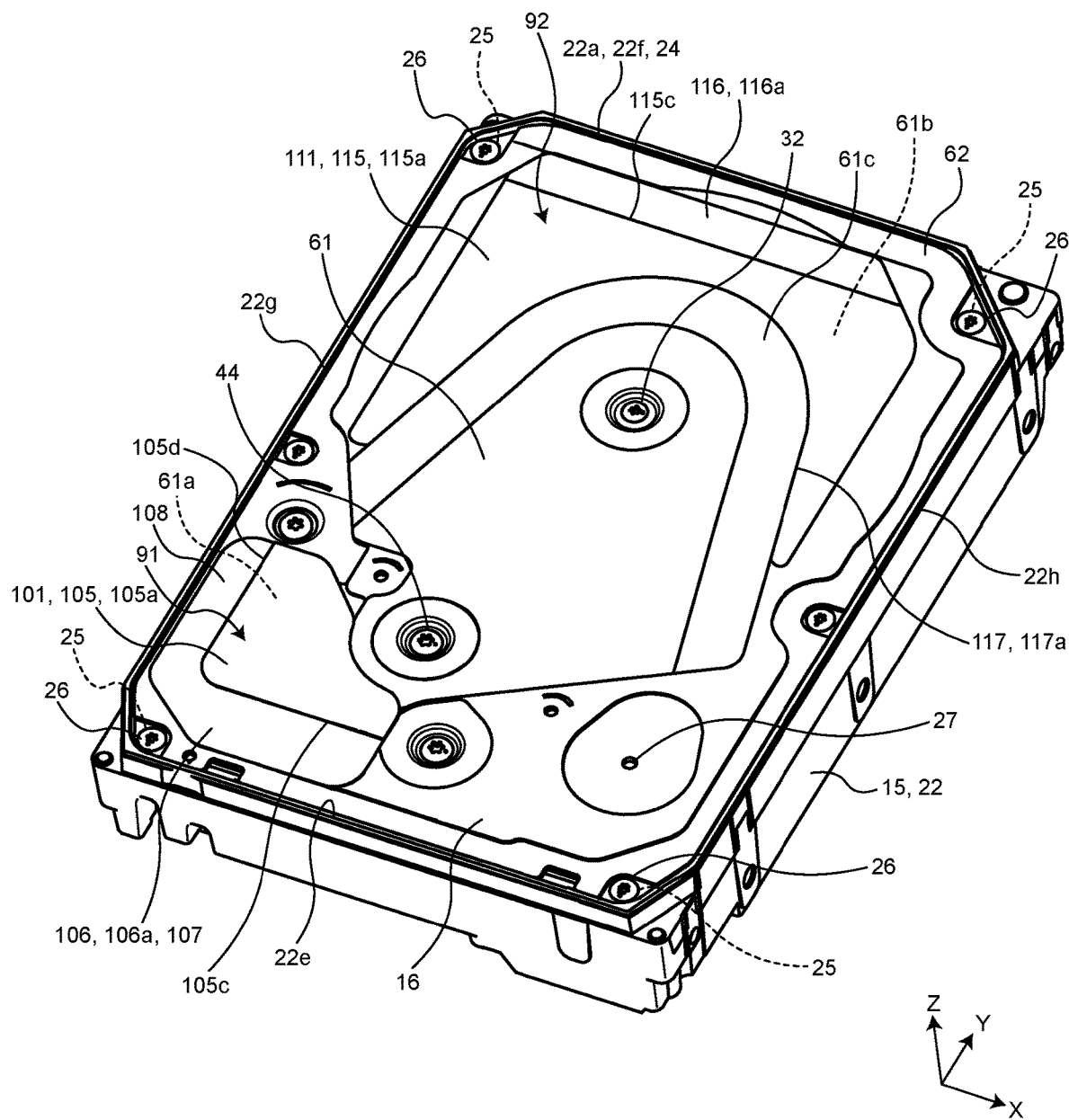
FIG. 4 is an exemplary perspective view illustrating the HDD of the embodiment excluding an outer cover and a protector.
Figure 5:
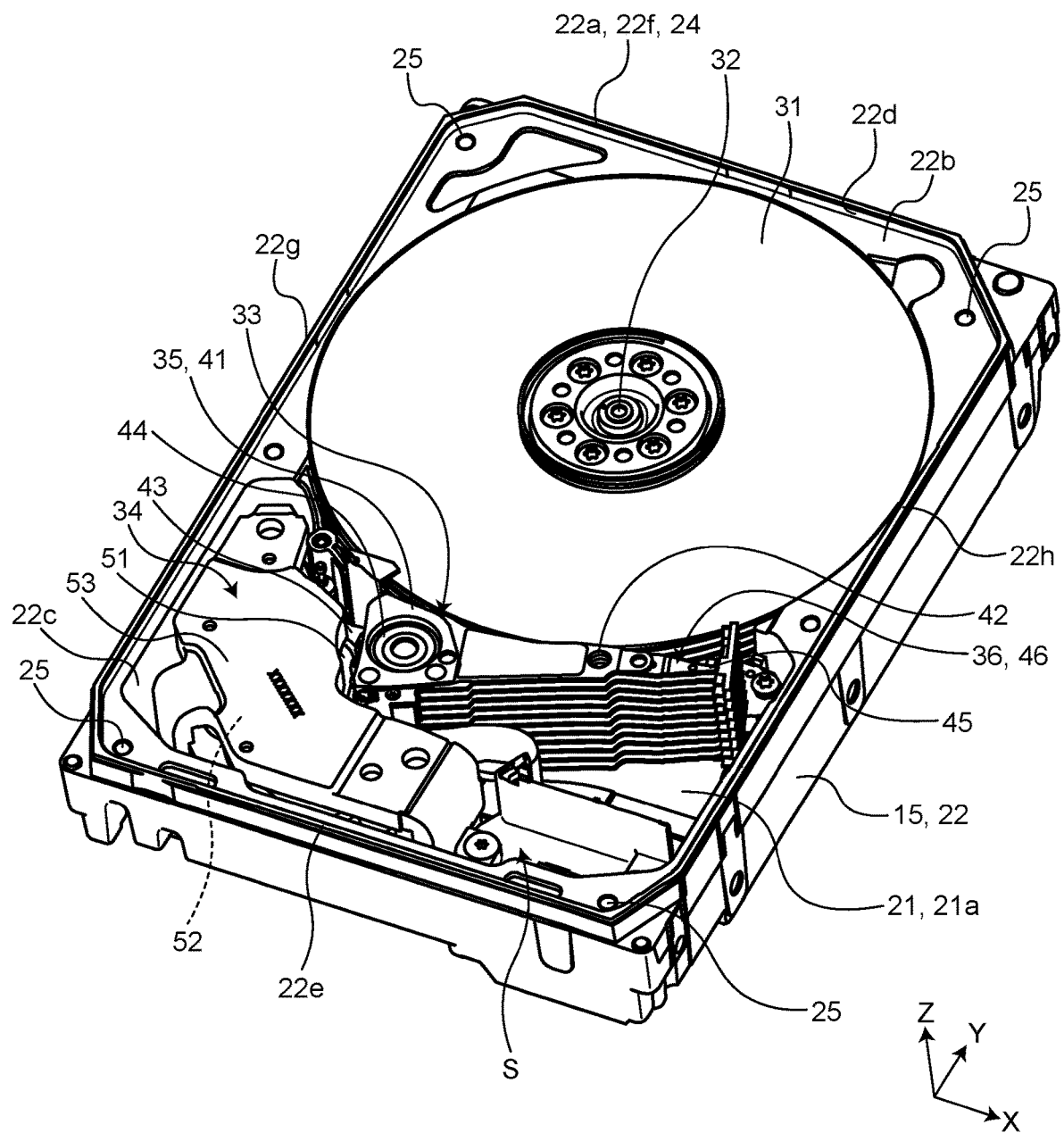
FIG. 5 is an exemplary perspective view illustrating the HDD of the embodiment excluding an inner cover, an outer cover, and a protector.

FIG. 4 is an exemplary perspective view illustrating the HDD 10 excluding the outer cover 17 and the protectors 18 and 19 of the embodiment. FIG. 5 is an exemplary perspective view illustrating the HDD 10 excluding the inner cover 16, the outer cover 17, and the protectors 18 and 19 of the embodiment. As illustrated in FIG. 5, the base 15 has a bottom wall 21 and a side wall 22.

The bottom wall 21 is formed in a substantially rectangular (quadrangular) plate shape extending on an X-Y plane. The bottom wall 21 has a bottom surface 21*a*. The bottom surface 21*a* faces substantially in the +Z direction as a whole. Note that the bottom surface 21*a* may be uneven.

The side wall 22 protrudes substantially in the +Z direction from the bottom surface 21*a*. The +Z direction is an example of the first direction. The side wall 22 is formed in a substantially rectangular frame shape. The bottom surface 21*a* and the frame-shaped side wall 22 form (specify, or partition) an inner space S inside the base 15. In other words, the inner space S is included on an inner side of the bottom surface 21*a* and the side walls 22. The inner space S is opened to the outside of the base 15 at an end of the base 15 in the +Z direction.

As illustrated in FIG. 2, the side wall 22 has an end surface 22*a*, a mounting surface 22*b*, an inner surface 22*c*, and an intermediate surface 22*d*. Note that the side wall 22 is not limited to this example. The end surface 22*a* is an example of the support surface.

The end surface 22*a* is provided at an end of the side wall 22 in the +Z direction. The end surface 22*a* is formed to be substantially flat and faces substantially in the +Z direction. The end surface 22*a* is formed in a substantially rectangular frame shape. In other words, the end surface 22*a* is formed in an endless shape.

As illustrated in FIG. 5, the end surface 22*a* has two short sides 22*e* and 22*f* and two long sides 22*g* and 22*h*. The short side 22*e* is positioned at an end of the base 15 in the −Y direction. The short side 22*f* is positioned at the end of the base 15 in the +Y direction. Each of the short sides 22*e* and 22*f* extends substantially in the X direction. The long side 22*g* is positioned at an end of the base 15 in the −X direction. The long side 22*h* is positioned at an end of the base 15 in the +X direction. Each of the long sides 22*g* and 22*h* extends substantially in the Y direction.

The mounting surface 22*b* is surrounded by the end surface 22*a* in a projection surface projected in the Z direction. The mounting surface 22*b* is positioned in the vicinity of the end surface 22*a* and is closer to the bottom surface 21*a* than the end surface 22*a* in the Z direction. In other words, the mounting surface 22*b* is recessed substantially in the −Z direction from the end surface 22*a*.

The mounting surface 22*b* is formed to be substantially flat and faces substantially in the +Z direction. The mounting surface 22*b* is formed in a substantially rectangular frame shape. Note that the mounting surface 22*b* is not limited to this example. The mounting surface 22*b* includes a plurality of screw holes 25.

The inner surface 22*c* is provided between the inner edge of the mounting surface 22*b* and the bottom surface 21*a*. The inner surface 22*c* faces the inside of the inner space S. The intermediate surface 22*d* is provided between the inner edge of the end surface 22*a* and the outer edge of the mounting surface 22*b*.

In another expression, the side wall 22 has a rib 24 protruding substantially in the +Z direction from the mounting surface 22*b*. The rib 24 is formed in a substantially rectangular frame shape. The rib 24 has the end surface 22*a* and the intermediate surface 22*d*.

As illustrated in FIG. 4, the housing 11 further has a plurality of screws 26. The inner cover 16 is supported by, for example, the mounting surface 22*b* and is attached to the mounting surface 22*b* by the screws 26. As a result, the inner cover 16 is attached to the base 15 in such a manner as to close the inner space S substantially airtightly. For example, a gasket is provided between the inner cover 16 and the mounting surface 22*b*.

As illustrated in FIG. 2, the outer cover 17 covers the inner cover 16 via a gap G and is supported by the end surface 22*a*. In the present embodiment, the edge of the outer cover 17 is joined to the end surface 22*a* by welding over the entire circumference. As a result, the outer cover 17 is joined to the base 15 in such a manner as to airtightly close the inner space S. That is, the inner cover 16 and the outer cover 17 seal the inner space S. The housing 11 has weld beads B with which the outer cover 17 is welded to the base 15. The weld beads B are an example of a portion at which the second cover is joined to the base.

The outer cover 17 may be joined to another portion of the base 15. For example, the outer cover 17 may have a portion surrounding the side wall 22 and may be joined to the side wall 22 at this portion. Alternatively, the outer cover 17 may be joined to the base 15 by another method such as bonding.

As illustrated in FIG. 4, an air vent 27 is included in the inner cover 16. Furthermore, as illustrated in FIG. 1, an air vent 28 is included in the outer cover 17. When the HDD 10 is assembled, air in the inner space S is extracted from air vents 27 and 28. Furthermore, the inner space S is filled with a gas different from air.

The gas filled in the inner space S is, for example, a low density gas having a density lower than that of air, an inert gas having low reactivity, or the like. For example, the inner space S is filled with helium. The inner space S may be filled with another fluid.

The air vent 28 of the outer cover 17 is closed by a sticker 29. The sticker 29 airtightly seals the air vent 28 and suppresses the gas filled in the inner space S from leaking through the air vents 27 and 28.

The protector 18 is positioned at an end of the housing 11 in the −Y direction. The protector 18 covers an end of the side wall 22 in the −Y direction, an end of the outer cover 17 in the −Y direction, and weld beads B. The −Y direction is a direction orthogonal to the +Z direction and is an example of the second direction.

The protector 19 is positioned at an end of the housing 11 in the +Y direction. The protector 19 covers an end of the side wall 22 in the +Y direction, an end of the outer cover 17 in the +Y direction, and weld beads B.

As illustrated in FIG. 5, the HDD 10 further includes a plurality of magnetic disks 31, a spindle motor 32, a head stack assembly (HSA) 33, and a voice coil motor (VCM) 34. The VCM 34 is an example of an actuator.

The magnetic disks 31, the spindle motor 32, the HSA 33, and the VCM 34 are disposed in the inner space S. Therefore, the bottom surface 21*a* of the base 15 faces the magnetic disks 31, the spindle motor 32, the HSA 33, and the VCM 34. Furthermore, the side wall 22 surrounds the magnetic disks 31, the spindle motor 32, the HSA 33, and the VCM 34.

A magnetic disk 31 is, for example, a recording medium in which magnetic recording layers are included on an upper surface and a lower surface. The diameter of the magnetic disk 31 is, for example, 3.5 inches. Note that the magnetic disk 31 is not limited to this example.

The magnetic disk 31 is disposed on an X-Y plane. The plurality of magnetic disks 31 is stacked at intervals substantially in the Z direction. The HDD 10 of the embodiment includes ten or more magnetic disks 31 arranged in the Z direction. Note that the number of magnetic disks 31 is not limited to this example.

The spindle motor 32 supports and rotates the plurality of magnetic disks 31. The plurality of magnetic disks 31 is held by a hub of the spindle motor 32 by, for example, a clamp spring. The spindle motor 32 is attached to, for example, the bottom wall 21 of the base 15 and supported by the inner cover 16.

The HSA 33 has a carriage 35 and a plurality of head gimbal assemblies (HGAs) 36. The carriage 35 has an actuator block 41, a plurality of arms 42, and a holder 43.

For example, the support shaft 44 is provided at a position separated from the magnetic disks 31 in a direction substantially orthogonal to the Z direction. The support shaft 44 extends substantially in the +Z direction from the bottom wall 21 and is supported by the inner cover 16. The actuator block 41 is rotatably attached to the support shaft 44, for example, via a bearing.

The plurality of arms 42 protrudes from the actuator block 41 substantially in parallel to a direction substantially orthogonal to the Z direction. The plurality of arms 42 is arranged at intervals in the Z direction. Each of the plurality of arms 42 is formed in a plate shape capable of entering between two adjacent magnetic disks 31 among the plurality of magnetic disks 31. The holder 43 protrudes from the actuator block 41 in a direction opposite to the arms 42.

Each of the plurality of HGAs 36 includes a magnetic head 45 and a suspension 46. The magnetic head 45 may also be referred to as a slider. A magnetic head 45 records and reproduces information on and from a recording layer of a magnetic disk 31. In other words, the magnetic head 45 reads and writes information from and to the magnetic disk 31.

A suspension 46 includes, for example, a base plate, a load beam extending from the base plate, and a flexure attached to the base plate and the load beam. The flexure is one type of flexible printed circuit boards (FPCs).

The base plate is attached to the tip of the arm 42. The magnetic head 45 is mounted on the flexure. With this structure, the magnetic head 45 is attached to the suspension 46. Furthermore, the suspension 46 is attached to the carriage 35.

The VCM 34 has a coil 51, a magnet 52, and a yoke 53. The coil 51 is held by the holder 43 of the carriage 35. The magnet 52 is, for example, a permanent magnet, and is attached to the base 15 via the yoke 53.

When the coil 51 is energized, the carriage 35 rotates around the support shaft 44 by electromagnetic force generated by the current of the coil 51 and the magnetic field of the magnet 52. In this manner, the VCM 34 causes the carriage 35 to rotate to move a magnetic head 45, attached to the carriage 35 via a suspension 46, to a desired position.

As illustrated in FIG. 4, the inner cover 16 has a central portion 61 and an outer periphery 62. The central portion 61 is a part of the inner cover 16 formed in a substantially rectangular plate shape. The central portion 61 includes the air vent 27 and supports the spindle motor 32 and the support shaft 44. The outer periphery 62 is a part of the inner cover 16 formed in a substantially rectangular frame shape. The outer periphery 62 surrounds the central portion 61. As illustrated in FIG. 2, the outer periphery 62 is supported by the mounting surface 22b of the side wall 22 and is attached to the mounting surface 22b by the screws 26.

In the Z direction, the thickness of the central portion 61 is substantially equal to the thickness of the outer periphery 62. The outer periphery 62 is closer to the bottom surface 21a of the bottom wall 21 than the central portion 61. For example, the inner cover 16 is bent by, for example, press working in such a manner that the central portion 61 protrudes substantially in the +Z direction from the inner edge of the outer periphery 62.

As illustrated in FIG. 4, the central portion 61 has two mounting surfaces 61a and 61b and an inclined surface 61c. The mounting surfaces 61a and 61b are formed to be substantially flat and face substantially in the +Z direction. The mounting surfaces 61a and 61b face the outer cover 17 via the gap G between the inner cover 16 and the outer cover 17.

The mounting surface 61a is provided at an end of the central portion 61 in the -X direction and the -Y direction. The magnet 52 of the VCM 34 overlaps the mounting surface 61a in the +Z direction. In other words, at least a part of the mounting surface 61a is provided at a position separated from or adjacent to the magnet 52 in the +Z direction. Note that the mounting surface 61a may be provided at another position.

The mounting surface 61b is provided at an end of the central portion 61 in the +Y direction. The magnetic disks 31 overlaps the mounting surface 61b in the +Z direction. Note that the mounting surface 61b may be provided at another position.

The inclined surface 61c is adjacent to the mounting surface 61b and faces the outer cover 17 via the gap G. In the present embodiment, the inclined surface 61c is positioned around the spindle motor 32 and is continuous with the mounting surface 61b. The inclined surface 61c extends obliquely from the mounting surface 61b towards the outer cover 17.

As illustrated in FIG. 2, the outer cover 17 has a central portion 71 and an outer periphery 72. The central portion 71 is a part of the outer cover 17 formed in a substantially rectangular plate shape. As illustrated in FIG. 1, the air vent 28 is included in the central portion 71. The outer periphery 72 is a part of the outer cover 17 formed in a substantially rectangular frame shape. The outer periphery 72 surrounds the central portion 71. As illustrated in FIG. 2, the outer periphery 72 is supported by the end surface 22a of the side wall 22 and is joined to the end surface 22a by welding.

In the Z direction, the thickness of the central portion 71 is substantially equal to the thickness of the outer periphery 72. The outer periphery 72 is closer to the bottom surface 21a of the bottom wall 21 than the central portion 71. For example, the outer cover 17 is bent in such a manner that the central portion 71 protrudes substantially in the +Z direction from the inner edge of the outer periphery 72. Note that the outer periphery 72 may obliquely extend from the central portion 71 towards the end surface 22a of the side wall 22.

The central portion 71 has an outer surface 71a and an inner surface 71b. The outer surface 71a is included at an end of the outer cover 17 in the +Z direction. The outer surface 71a is formed to be substantially flat and faces substantially in the +Z direction. The inner surface 71b is positioned on the opposite side of the outer surface 71a. The inner surface 71b is formed to be substantially flat and faces substantially in the −Z direction. The inner surface 71b faces the central portion 61 of the inner cover 16 via the gap G.

The outer periphery 72 has a recessed surface 72a and an inner surface 72b. The recessed surface 72a is connected to the outer surface 71a of the central portion 71 and faces substantially in the +Z direction as a whole. In the present embodiment, the recessed surface 72a is formed to be substantially flat at a position closer to the bottom surface 21a of the bottom wall 21 than the outer surface 71a and faces substantially in the +Z direction.

As illustrated in FIG. 1, the recessed surface 72a forms (specify, or partition) two recesses 75 and 76. The recess 75 is recessed from the outer surface 71a at an end of the outer cover 17 in the −Y direction. The recess 76 is recessed from the outer surface 71a at an end of the outer cover 17 in the +Y direction. The recesses 75 and 76 extend substantially in the X direction and are provided over both ends of the outer cover 17 in the X direction.

As illustrated in FIG. 2, the inner surface 72b is positioned on the opposite side of the recessed surface 72a. The inner surface 72b is supported by the end surface 22a of the side wall 22. The inner surface 72b faces the central portion 61 and the outer periphery 62 of the inner cover 16. Each of the mounting surfaces 61a and 61b of the central portion 61 faces the inner surface 71b of the central portion 71 and the inner surface 72b of the outer periphery 72 of the outer cover 17.

The gap G between the inner cover 16 and the outer cover 17 has a wide gap GW and a narrow gap GN. The gap GW is a gap between the mounting surface 61a or the mounting surface 61b of the central portion 61 of the inner cover 16 and the inner surface 71b of the central portion 71 of the outer cover 17. The gap GN is a gap between the mounting surface 61a or the mounting surface 61b of the central portion 61 of the inner cover 16 and the inner surface 72b of the outer periphery 72 of the outer cover 17.

In the Z direction (+Z direction), a distance between the mounting surface 61a or the mounting surface 61b and the inner surface 71b is larger than a distance between the mounting surface 61a or the mounting surface 61b and the inner surface 72b. Therefore, the gap GW is wider than the gap GN in the Z direction. The gap GW and the gap GN communicate with each other.

The protector 18 has an upper wall 81 and an end wall 82. The upper wall 81 is an example of a covering wall. The upper wall 81 is disposed in the recess 75 and extends substantially in the X direction along the recess 75. Therefore, the upper wall 81 covers the outer periphery 72 of the outer cover 17.

The upper wall 81 has an upper surface 81a and an inner surface 81b. The upper surface 81a is formed to be substantially flat and faces substantially in the +Z direction. The inner surface 81b is positioned on the opposite side of the upper surface 81a. The inner surface 81b is formed to be substantially flat and faces substantially in the −Z direction. The inner surface 81b faces the recessed surface 72a of the outer periphery 72.

The inner surface 81b of the upper wall 81 is attached to the recessed surface 72a of the outer periphery 72 by, for example, an adhesive agent A1. The adhesive agent A1 is, for example, a synthetic adhesive agent. The adhesive agent A1 is not limited to this example and may be another substance capable of bonding a plurality of parts to each other, such as a double-sided tape.

In the Z direction (+Z direction), a depth L1 of the recess 75 is equal to or greater than a sum L2 of the thickness of the upper wall 81 and the thickness of the adhesive agent A1. Therefore, the upper wall 81 does not protrude beyond the outer surface 71a of the central portion 71 to the outside of the recess 75. The depth L1 is, for example, a distance in the Z direction between the outer surface 71a and a portion of the recessed surface 72a closest to the bottom surface 21a of the bottom wall 21. The sum L2 of the thicknesses is, for example, a distance in the Z direction between the upper surface 81a and a portion of the recessed surface 72a to which the adhesive agent A1 is attached.

The end wall 82 extends substantially in the −Z direction from an end of the upper wall 81 in the −Y direction. That is, a cross section of the protector 18 having the upper wall 81 and the end wall 82 is formed in a substantially L shape. The end wall 82 covers the side wall 22.

As illustrated in FIG. 3, the protector 19 has an upper wall 85 and an end wall 86. The upper wall 85 is an example of a covering wall. The upper wall 85 is disposed in the recess 76 and extends substantially in the X direction along the recess 76. Therefore, the upper wall 85 covers the outer periphery 72 of the outer cover 17.

The upper wall 85 has an upper surface 85a and an inner surface 85b. The upper surface 85a is formed to be substantially flat and faces substantially in the +Z direction. The inner surface 85b is positioned on the opposite side of the upper surface 85a. The inner surface 85b is formed to be substantially flat and faces substantially in the −Z direction. The inner surface 85b faces the recessed surface 72a of the outer periphery 72. The inner surface 85b of the upper wall 85 is attached to the recessed surface 72a of the outer periphery 72 by, for example, an adhesive agent A2. The adhesive agent A2 is, for example, a synthetic adhesive agent.

In the Z direction (+Z direction), the depth of the recess 76 is equal to or greater than a sum of the thickness of the upper wall 85 and the thickness of the adhesive agent A2. Therefore, the upper wall 85 does not protrude beyond the outer surface 71a of the central portion 71 to the outside of the recess 75.

The end wall 86 extends substantially in the −Z direction from an end of the upper wall 85 in the +Y direction. That is, a cross section of the protector 19 having the upper wall 85 and the end wall 86 is formed in a substantially L shape. The end wall 86 covers the side wall 22.

As illustrated in FIG. 4, the HDD 10 of the embodiment further includes two dampers 91 and 92. The dampers 91 and 92 are disposed in the gap G between the inner cover 16 and the outer cover 17.

As illustrated in FIG. 2, the damper 91 has a constrained layer 101 and a viscoelastic material (VEM) 102. Note that the damper 91 is not limited to this example. The constrained layer 101 may also be referred to as a damping plate.

The constrained layer 101 is made of metal such as ferromagnetic stainless steel. That is, the constrained layer 101 is a ferromagnetic body (magnetic body). The ferromagnetic stainless steel is, for example, SUS 400 stainless steel series (ferritic stainless steel and martensitic stainless steel) in the Japanese Industrial Standards (JIS). Specifically, the constrained layer 101 is made of SUS 430. Note that the constrained layer 101 may be made of another ferromagnetic body or a non-magnetic body.

The material of the inner cover 16 has a coefficient of thermal expansion closer to that of the material of the base 15 than the material of the constrained layer 101. That is, the inner cover 16 and the constrained layer 101 are both made of stainless steel, but the inner cover 16 is made of a type of stainless steel close to that of the base 15 with respect to the coefficient of thermal expansion.

The constrained layer 101 is located in the gap G between the inner cover 16 and the outer cover 17 and is formed in a plate shape arranged on an X-Y plane. The viscoelastic material 102 is interposed between the mounting surface 61a of the central portion 61 of the inner cover 16 and the constrained layer 101. As a result, the viscoelastic material 102 attaches the constrained layer 101 to the mounting surface 61a.

The constrained layer 101 has a plurality of portions having mutually different thicknesses. The constrained layer 101 of the present embodiment includes a larger-thickness part 105 and a smaller-thickness part 106. The larger-thickness part 105 and the smaller-thickness part 106 are integrally formed and connected to each other. In the Z direction (+Z direction), the larger-thickness part 105 is thicker than the smaller-thickness part 106, and the smaller-thickness part 106 is thinner than the larger-thickness part 105.

The larger-thickness part 105 is positioned between the mounting surface 61a of the central portion 61 of the inner cover 16 and the inner surface 71b of the central portion 71 of the outer cover 17. That is, the larger-thickness part 105 is positioned in the wide gap GW. The larger-thickness part 105 has an upper surface 105a and an inner surface 105b.

The upper surface 105a is formed to be substantially flat and faces substantially in the +Z direction. The upper surface 105a faces the inner surface 71b of the central portion 71. The inner surface 105b is positioned on the opposite side of the upper surface 105a. The inner surface 105b is formed to be substantially flat and faces substantially in the −Z direction. The inner surface 105b faces the mounting surface 61a of the central portion 61.

As illustrated in FIG. 4, the larger-thickness part 105 further has two edges 105c and 105d. The edges 105c and 105d may also be referred to as sides. The edge 105c is included at an end of the larger-thickness part 105 in the −Y direction and extends substantially in the X direction. The edge 105d is provided at an end of the larger-thickness part 105 in the −X direction and extends substantially in the Y direction.

The edge 105c faces a portion of the rib 24 having a short side 22e and extends along the short side 22e. The edge 105d faces a portion of the rib 24 having a long side 22g and extends along the long side 22g.

The smaller-thickness part 106 is positioned between the end surface 22a of the side wall 22 and the larger-thickness part 105. In other words, the smaller-thickness part 106 is positioned between the weld beads B and the larger-thickness part 105. The smaller-thickness part 106 is included along a portion of the end surface 22a of the side wall 22 close to the mounting surface 61a and the larger-thickness part 105.

As illustrated in FIG. 2, the smaller-thickness part 106 is positioned between the mounting surface 61a of the central portion 61 of the inner cover 16 and the inner surface 72b of the outer periphery 72 of the outer cover 17. That is, the smaller-thickness part 106 is positioned in the narrow gap GN. As illustrated in FIG. 4, the smaller-thickness part 106 includes a first smaller-thickness part 107 and a second smaller-thickness part 108.

The first smaller-thickness part 107 protrudes substantially in the −Y direction from the edge 105c of the larger-thickness part 105. Therefore, the first smaller-thickness part 107 is positioned between an end of the inner cover 16 in the −Y direction and the larger-thickness part 105. The first smaller-thickness part 107 extends substantially in the X direction along the short side 22e. In other words, the first smaller-thickness part 107 extends substantially in parallel to the short side 22e.

The second smaller-thickness part 108 protrudes substantially in the −X direction from the edge 105d of the larger-thickness part 105. Therefore, the second smaller-thickness part 108 is positioned between an end of the inner cover 16 in the −X direction and the larger-thickness part 105. The −X direction is orthogonal to the +Z direction and orthogonal to the −Y direction and is an example of a third direction.

The second smaller-thickness part 108 extends substantially in the Y direction along the long side 22g. In other words, the second smaller-thickness part 108 extends substantially in parallel to the long side 22g. An end of the first smaller-thickness part 107 in the −X direction and an end of the second smaller-thickness part 108 in the −Y direction are connected to each other. Therefore, the smaller-thickness part 106 is formed in a substantially L shape.

The length (width) of the first smaller-thickness part 107 in the Y direction (−Y direction) is longer than the length (width) of the second smaller-thickness part 108 in the X (−X) direction. Note that the widths of the first smaller-thickness part 107 and the second smaller-thickness part 108 are not limited to this example.

As illustrated in FIG. 2, the first smaller-thickness part 107 of the smaller-thickness part 106 overlaps the upper wall 81 of the protector 18 in the +Z direction. On the other hand, the larger-thickness part 105 and the second smaller-thickness part 108 are separated from the protector 18 in a direction orthogonal to the Z direction (+Z direction). In other words, the larger-thickness part 105 and the second smaller-thickness part 108 do not overlap the protector 18.

The smaller-thickness part 106 further has an upper surface 106a and an inner surface 106b. Each of the first smaller-thickness part 107 and the second smaller-thickness part 108 has a part of the upper surface 106a and a part of the inner surface 106b.

The upper surface 106a is formed to be substantially flat and faces substantially in the +Z direction. The upper surface 106a faces the inner surface 71b of the central portion 71 and the inner surface 72b of the outer periphery 72. The upper surface 106a of the smaller-thickness part 106 is closer to the bottom surface 21a of the bottom wall 21 than the upper surface 105a of the larger-thickness part 105.

The inner surface 106b is positioned on the opposite side of the upper surface 106a. The inner surface 106b is formed to be substantially flat and faces substantially in the −Z direction. The inner surface 106b faces the mounting surface 61a of the central portion 61. The inner surface 105b of the larger-thickness part 105 and the inner surface 106b of the smaller-thickness part 106 form substantially the same plane and are continuous with each other.

The viscoelastic material 102 is interposed between the inner surface 105b of the larger-thickness part 105 and the mounting surface 61a of the central portion 61 of the inner cover 16. Furthermore, the viscoelastic material 102 is interposed between the inner surface 106b of the smaller-thickness part 106 and the mounting surface 61a of the central portion 61 of the inner cover 16. That is, both the larger-thickness part 105 and the smaller-thickness part 106 are attached to the mounting surface 61a by the viscoelastic material 102.

In the Z direction (+Z direction), a difference L3 between the thickness of the larger-thickness part 105 and the thickness of the smaller-thickness part 106 is equal to or larger than a sum L2 of the thickness of the upper wall 81 and the thickness of the adhesive agent A1. The thickness difference L3 is a distance in the Z direction between the upper surface 105a of the larger-thickness part 105 and the upper surface 106a of the smaller-thickness part 106.

An adhesive agent A3 adheres to the inner surface 71b of the central portion 71 and the inner surface 72b of the outer periphery 72 of the outer cover 17. The adhesive agent A3 is, for example, a double-sided tape. The adhesive agent A3 attaches the inner surface 71b of the central portion 71 to the upper surface 105a of the larger-thickness part 105. Furthermore, the adhesive agent A3 attaches the inner surface 72b of the outer periphery 72 to the upper surface 106a of the smaller-thickness part 106.

Figure 6:
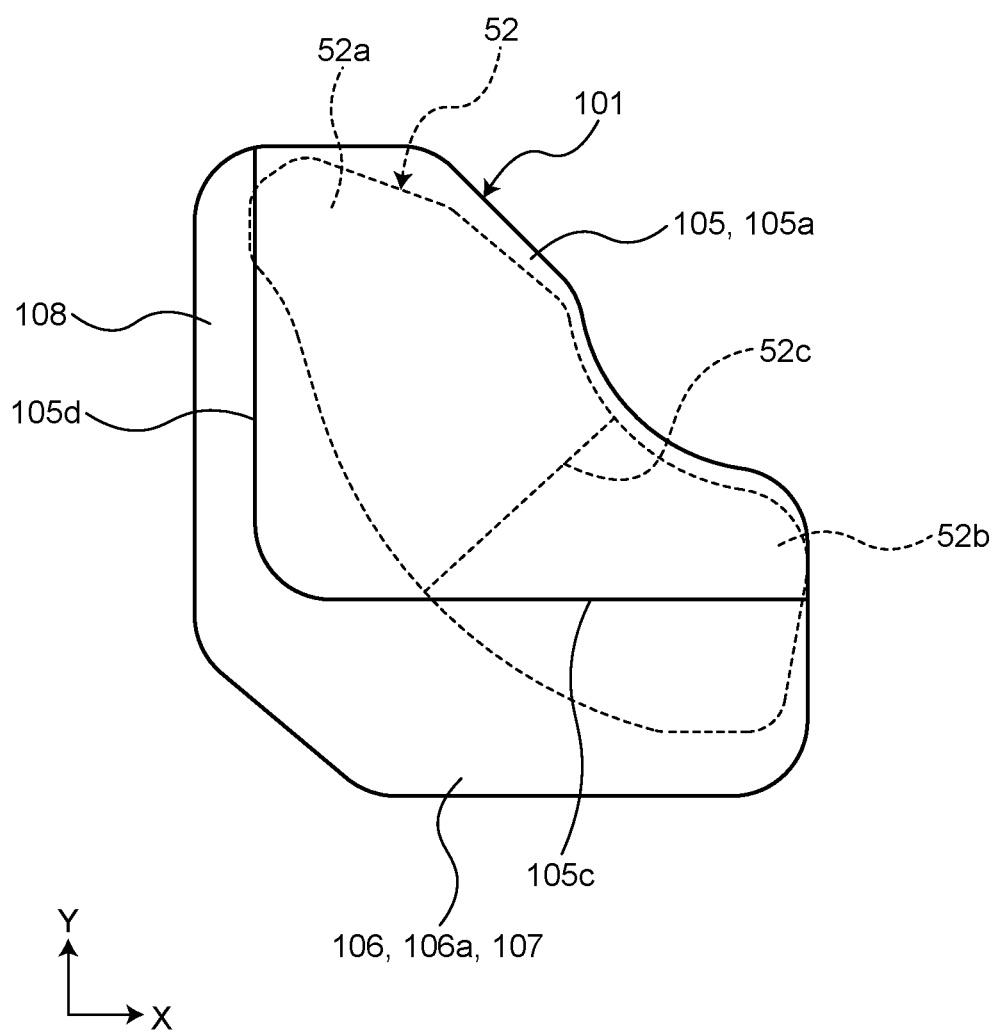
FIG. 6 is an exemplary plan view illustrating a magnet and a constrained layer of the embodiment.

FIG. 6 is an exemplary plan view illustrating the magnet 52 and the constrained layer 101 of the present embodiment. As illustrated in FIG. 6, the entire magnet 52 overlaps the constrained layer 101 in the +Z direction. Note that a part of the magnet 52 may not overlap the constrained layer 101.

The magnet 52 has two magnetic poles 52a and 52b and a boundary 52c. Note that the magnet 52 may have three or more magnetic poles. The two magnetic poles 52a and 52b are adjacent to each other in a direction orthogonal to the Z direction (+Z direction). The magnetic pole 52a is one of the N pole and the S pole, and the magnetic pole 52b is the other one. The boundary 52c is a boundary between the two magnetic poles 52a and 52b.

In the present embodiment, the most part of the magnetic poles 52a and 52b overlap the larger-thickness part 105 in the +Z direction. The entire boundary 52c overlaps the larger-thickness part 105 in the +Z direction. Note that parts of the magnetic poles 52a and 52b and the boundary 52c may overlap the smaller-thickness part 106 and may not overlap the constrained layer 101.

As illustrated in FIG. 3, the damper 92 has a constrained layer 111 and a viscoelastic material 112. Note that the damper 92 is not limited to this example. Like the constrained layer 101 of the damper 91, the constrained layer 111 is made of metal such as ferromagnetic stainless steel.

The constrained layer 111 is located in the gap G between the inner cover 16 and the outer cover 17 and is formed in a plate shape arranged on an X-Y plane. The viscoelastic material 112 is interposed between the mounting surface 61b of the inner cover 16 and the constrained layer 111. As a result, the viscoelastic material 112 attaches the constrained layer 111 to the mounting surface 61b.

The constrained layer 111 includes a larger-thickness part 115 and two smaller-thickness parts 116 and 117. The larger-thickness part 115 and the smaller-thickness parts 116 and 117 are integrally formed and connected to each other. In the Z direction (+Z direction), the larger-thickness part 115 is thicker than the smaller-thickness parts 116 and 117.

The larger-thickness part 115 is positioned between the mounting surface 61b of the central portion 61 of the inner cover 16 and the inner surface 71b of the central portion 71 of the outer cover 17. That is, the larger-thickness part 115 is positioned in the wide gap GW. The larger-thickness part 115 has an upper surface 115a and an inner surface 115b.

The upper surface 115a is formed to be substantially flat and faces substantially in the +Z direction. The upper surface 115a faces the inner surface 71b of the central portion 71. The inner surface 115b is positioned on the opposite side of the upper surface 115a. The inner surface 115b is formed to be substantially flat and faces substantially in the −Z direction. The inner surface 115b faces the mounting surface 61b of the central portion 61.

As illustrated in FIG. 4, the larger-thickness part 115 further has an edge 115c. The edge 115c is provided at an end of the larger-thickness part 115 in the +Y direction and extends substantially in the X direction. The edge 115c faces a portion of the rib 24 having the short side 22f and extends along the short side 22f.

The smaller-thickness part 116 is positioned between the end surface 22a of the side wall 22 and the larger-thickness part 115. In other words, the smaller-thickness part 116 is positioned between the weld beads B and the larger-thickness part 115. The smaller-thickness part 116 is included along a portion of the end surface 22a of the side wall 22 close to the mounting surface 61b and the larger-thickness part 115.

As illustrated in FIG. 3, the smaller-thickness part 116 is positioned between the mounting surface 61b of the central portion 61 of the inner cover 16 and the inner surface 72b of the outer periphery 72 of the outer cover 17. That is, the smaller-thickness part 116 is positioned in the narrow gap GN.

The smaller-thickness part 116 protrudes substantially in the +Y direction from the edge 115c of the larger-thickness part 115. Therefore, the smaller-thickness part 116 is positioned between the end of the inner cover 16 in the +Y direction and the larger-thickness part 115. The smaller-thickness part 116 extends substantially in the X direction along the short side 22f. In other words, the smaller-thickness part 116 extends substantially in parallel to the short side 22f.

The smaller-thickness part 116 has an upper surface 116a and an inner surface 116b. The upper surface 116a is formed to be substantially flat and faces substantially in the +Z direction. The upper surface 116a faces the inner surface 71b of the central portion 71 and the inner surface 72b of the outer periphery 72. The upper surface 116a of the smaller-thickness part 116 is closer to the bottom surface 21a of the bottom wall 21 than the upper surface 115a of the larger-thickness part 115.

The inner surface 116b is positioned on the opposite side of the upper surface 116a. The inner surface 116b is formed to be substantially flat and faces substantially in the −Z direction. The inner surface 116b faces the mounting surface 61b of the central portion 61. The inner surface 115b of the larger-thickness part 115 and the inner surface 116b of the smaller-thickness part 116 form substantially the same plane and are continuous with each other.

The smaller-thickness part 117 protrudes from the larger-thickness part 115 towards the inclined surface 61c of the central portion 61 of the inner cover 16. The larger-thickness part 115 is positioned between the smaller-thickness part 116 and the smaller-thickness part 117. Note that the smaller-thickness part 117 may be omitted.

The smaller-thickness part 117 has an upper surface 117a and an inner surface 117b. The upper surface 117a is formed to be substantially flat and faces substantially in the +Z direction. The upper surface 117a faces the inner surface 71b of the central portion 71. The upper surface 115a of the larger-thickness part 115 and the upper surface 117a of the smaller-thickness part 117 form substantially the same plane and are continuous with each other.

The inner surface 117b is positioned on the opposite side of the upper surface 117a. The inner surface 117b is formed to be substantially flat and faces substantially in the −Z direction. The inner surface 117b faces the inclined surface 61c of the central portion 61. The inner surface 117b of the smaller-thickness part 117 is farther from the bottom surface 21a of the bottom wall 21 than the inner surface 115b of the larger-thickness part 115.

The smaller-thickness part 116 overlaps the upper wall 85 of the protector 19 in the +Z direction. In the Z direction, a difference between the thickness of the larger-thickness part 115 and the thickness of the smaller-thickness part 116 is equal to or larger than the sum of the thickness of the upper wall 85 and the thickness of the adhesive agent A2. Meanwhile, the larger-thickness part 115 and the smaller-thickness part 117 are separated from the protector 19 in a direction orthogonal to the Z direction (+Z direction). In other words, the larger-thickness part 115 and the smaller-thickness part 117 do not overlap the protector 19.

The inclined surface 61c of the central portion 61 of the inner cover 16 overlaps the smaller-thickness part 117 in the +Z direction. Meanwhile, the larger-thickness part 115 and the smaller-thickness part 116 are separated from the inclined surface 61c in a direction orthogonal to the Z direction (+Z direction).

The viscoelastic material 112 is interposed between the inner surface 115b of the larger-thickness part 115 and the mounting surface 61b of the central portion 61 of the inner cover 16. Furthermore, the viscoelastic material 112 is interposed between the inner surface 116b of the smaller-thickness part 116 and the mounting surface 61b of the central portion 61 of the inner cover 16. That is, both the larger-thickness part 115 and the smaller-thickness part 116 are attached to the mounting surface 61b by the viscoelastic material 112.

An adhesive agent A4 adheres to the inner surface 71b of the central portion 71 and the inner surface 72b of the outer periphery 72 of the outer cover 17. The adhesive agent A4 is, for example, a double-sided tape. The adhesive agent A4 attaches the inner surface 71b of the central portion 71 to the upper surface 115a of the larger-thickness part 115 and the upper surface 117a of the smaller-thickness part 117. Furthermore, the adhesive agent A4 attaches the inner surface 72b of the outer periphery 72 to the upper surface 116a of the smaller-thickness part 116.

The magnetic disks 31 overlaps the constrained layer 111 in the +Z direction. Meanwhile, the spindle motor 32 is separated from the constrained layer 111 in a direction intersecting the Z direction (+Z direction). Note that a part of the magnetic disks 31 may not overlap the constrained layer 111.

The HDD 10 of the present embodiment is mounted on, for example, a server rack of a server. In the server rack, for example, a plurality of HDDs 10 and a cooling fan are mounted. Vibration generated by other devices such as the cooling fan may be transmitted to the HDDs 10.

When the vibration is input to an HDD 10, the housing 11 vibrates, and the vibration of the housing 11 is transmitted to the dampers 91 and 92. As a result, the constrained layers 101 and 111 vibrate with respect to the housing 11. The viscoelastic materials 102 and 112 are deformed between the constrained layers 101 and 111 and the inner cover 16 and converts vibration energy into heat. As a result, the dampers 91 and 92 attenuate the vibration of the housing 11.

The constrained layers 101 and 111 are attached to the outer cover 17 by the adhesive agents A3 and A4. However, outer cover 17 is thin and has lower rigidity than those of the constrained layers 101 and 111. Therefore, the outer cover 17 is deformed accompanied by the vibration of the constrained layers 101 and 111. In other words, despite being attached to the outer cover 17, the constrained layers 101 and 111 can vibrate with respect to the housing 11.

The damper 91 attenuates the vibration input to the housing 11 in the vicinity of the VCM 34. Therefore, the damper 91 can attenuate the vibration input to the HSA 33 in the vicinity of the VCM 34.

The damper 92 attenuates the vibration input to the housing 11 in the vicinity of the magnetic disks 31. Therefore, the damper 92 can attenuate the vibration input to the HSA 33 in the vicinity of the magnetic disks 31.

Since the vibration of the HSA 33 is attenuated by the dampers 91 and 92, the HDD 10 can accurately position the magnetic head 45 even though the recording density is high. That is, the HDD 10 can improve the recording density.

In the technical field of HDDs, the Small Form Factor Committee has formulated, for example, SFF-8300 which is a form factor of 3.5 inch hard disk drives. The SFF-8300 sets a plurality of maximum dimensions (hereinafter, referred to as specified dimensions) with regards to the dimensions of an HDD in the Z direction.

In an HDD filled with helium, for example, an outer cover is welded to a base, thereby suppressing leakage of helium. Furthermore, a protector protects a portion where the base and the outer cover are welded. However, in a case where the protector is attached to the outer cover, which is flat, disadvantageously, the HDD exceeds the specified dimensions, or a space inside the HDD is reduced.

In the present embodiment, the upper walls 81 and 85 of the protectors 18 and 19 are arranged in the recesses 75 and 76, respectively. As a result, the dimension of the HDD 10 in the Z direction conforms to the specified dimension, and the inner space S can be formed larger in the Z direction.

Meanwhile, with the recesses 75 and 76 included in the outer cover 17, a narrow gap GN is included in the gap G between the inner cover 16 and the outer cover 17. In addition, in a case where the number of magnetic disks 31 is large, the VCM 34 becomes larger in the Z direction. With the VCM 34 made larger, the gap GN is further narrowed at a position overlapping the VCM 34.

A damper having a thick constrained layer is difficult to be disposed in the small gap GN. However, the constrained layers 101 and 111 of the present embodiment have the smaller-thickness parts 106 and 116 that can be disposed in the gap GN. Therefore, the constrained layers 101 and 111 can also be disposed in the gap GN and can be formed to be wider along the inner cover 16.

Generally, a constrained layer is set to have a predetermined mass since the damper effectively attenuates vibration. In a case where the constrained layer is thin and light, the vibration attenuation action by the damper may be reduced. However, the constrained layers 101 and 111 of the present embodiment have the larger-thickness parts 105 and 115 in the wide gap GW, and thus the predetermined mass can be obtained.

As described above, the HDD 10 according to the present embodiment allows setting of the inner space S of a larger dimension in the Z direction and the constrained layers 101 and 111 having a suitable size to effectively attenuate the vibration in the gap G under the dimensional constraints such as the SFF-8300. Having the larger inner space S, the HDD 10 can increase, for example, the number of the magnetic disks 31 to mount, leading to increasing the storage capacity.

In the HDD 10 according to the first embodiment described above, the base 15 has the bottom surface 21a, the side wall 22, and the end surface 22a. The bottom surface 21a faces the magnetic disks 31. The side wall 22 protrudes from the bottom surface 21a in the +Z direction to surround the magnetic disks 31. The end surface 22a is located at the +Z directional end of the side wall 22. The inner space S is defined by the bottom surface 21a and the side wall 22, in which the magnetic disks 31 are disposed. The inner cover 16 is attached to the base 15 to close the inner space S. The outer cover 17 is joined to the base 15 while being supported by the end surface 22a, to cover the inner cover 16. The damper 91 includes the constrained layer 101 in-between the inner cover 16 and the outer cover 17, and the viscoelastic material 102 interposed between the inner cover 16 and the constrained layer 101. The constrained layer 101 includes the smaller-thickness part 106 and the larger-thickness part 105 connected to the smaller-thickness part 106. The smaller-thickness part 106 extends along the end surface 22a. The larger-thickness part 105 is thicker than the smaller-thickness part 106 in the +Z direction.

The end surface 22a is located at the end of the side wall 22 which surrounds the magnetic disks 31, thus the end surface 22s has a frame shape. As described above, the smaller-thickness part 106 extends along the end surface 22a. In other words, the smaller-thickness part 106 extends in the vicinity of the outer edges of the base 15, the inner cover 16, and the outer cover 17. There is generally a narrow gap G (gap GN) between the outer edge of the inner cover 16 and the outer edge of the outer cover 17. For example, the protector 18 that covers the weld beads B, at which the base 15 and the outer cover 17 are joined together, is attached to the outer edge of the outer cover 17. In this case, the outer periphery 72 of the outer cover 17 is bent to approach the inner cover 16, to allow the +Z directional dimensions of the HDD 10 to be within one of the specified ranges defined in the SFF-8300 and to form the recess 75 in which the protector 18 is fitted. For another example, the outer edge of the outer cover 17 can be bent and recessed to approach the inner cover 16 and the outer edge of the outer cover 17, in order to avoid the outer edge of the outer cover 17 at the corner of the HDD 10 from colliding with another component when mounting the HDD 10 on the server rack. In the present embodiment, the smaller-thickness part 106 of the constrained layer 101 is disposed in the vicinity of the outer edges of the inner cover 16 and the outer cover 17, that is, the smaller-thickness part 106 can be disposed in the narrow gap GN between the outer edge of the inner cover 16 and the outer edge of the outer cover 17. Namely, the constrained layer 101 can be disposed not only in the wide gap GW but also in the narrow gap GN between the outer edge of the inner cover 16 and the outer edge of the outer cover 17, covering a wider area. Meanwhile, the larger-thickness part 105 of the constrained layer 101 can be disposed in the wide gap G (gap GW) between the inner cover 16 and the outer cover 17 spaced from the outer edges. As such, the constrained layer 101 of a larger size can be attached to the inner cover 16 under the dimensional constraints of the HDD 10 according to various conditions. The damper 91 including a heavier constrained layer 101 can typically attenuate vibration more effectively. The constrained layer 101 of the present embodiment has a larger area and thickness, therefore, heavier in weight. Thus, the HDD 10 of the present embodiment can reduce vibration and noise by the damper 91.

For another example, the base 15 has the bottom surface 21a and the side wall 22. The bottom surface 21a faces the magnetic disks 31. The side wall 22 protrudes from the bottom surface 21a in the +Z direction to surround the magnetic disks 31. The inner space S defined by the bottom surface 21a and the side wall 22 accommodates the magnetic disks 31. The inner cover 16 is attached to the base 15 to close the inner space S. The outer cover 17 is joined to the base 15 to cover the inner cover 16. The damper 91 includes the constrained layer 101 in-between the inner cover 16 and the outer cover 17, and the viscoelastic material 102 interposed between the inner cover 16 and the constrained layer 101. The constrained layer 101 includes the larger-thickness part 105 and the smaller-thickness part 106 connected to the larger-thickness part 105. The smaller-thickness part 106 is thinner than the larger-thickness part 105 in the +Z direction, and located between the larger-thickness part 105 and the weld beads B at which the base 15 and the outer cover 17 are joined together.

As described above, the smaller-thickness part 106 extends between the weld beads B and the larger-thickness part 105. Thus, the smaller-thickness part 106 extends in the vicinity of the outer edges of the base 15, the inner cover 16, and the outer cover 17. There is generally a narrow gap GN between the outer edge of the inner cover 16 and the outer edge of the outer cover 17. In the present embodiment, the smaller-thickness part 106 of the constrained layer 101 is disposed in the vicinity of the outer edges of the inner cover 16 and the outer cover 17, that is, the smaller-thickness part 106 can be disposed in the narrow gap GN between the outer edge of the inner cover 16 and the outer edge of the outer cover 17. The constrained layer 101 can be thus disposed not only in the wide gap GW but also in the narrow gap GN between the outer edge of the inner cover 16 and the outer edge of the outer cover 17, covering a wider area. Meanwhile, the larger-thickness part 105 of the constrained layer 101 can be disposed in the wide gap GW between the inner cover 16 and the outer cover 17 spaced from the outer edges. As such, the constrained layer 101 of a larger size can be attached to the inner cover 16 under the dimensional constraints of the HDD 10 according to various conditions. In addition, the constrained layer 101 of the present embodiment is larger in area and thickness, therefore, heavier in weight. Thus, the HDD 10 of the present embodiment can reduce vibration and noise by the damper 91.

The outer cover 17 is joined to the end surface 22a. Accordingly, the gap GN between the outer edge of the inner cover 16 and the outer edge of the outer cover 17 decreases. However, in the present embodiment, the smaller-thickness part 106 of the constrained layer 101 is disposed in the vicinity of the outer edges of the inner cover 16 and the outer cover 17, that is, the smaller-thickness part 106 can be disposed in the narrow gap GN between the outer edge of the inner cover 16 and the outer edge of the outer cover 17. Because of this, the HDD 10 according to the present embodiment can include the constrained layer 101 of a larger size under the dimensional constraints of the HDD 10 according to various conditions, to be able to reduce vibration and noise by the damper 91.

The inner space S is filled with a gas different from air, such as helium. In this case, positioning of the magnetic heads 45 is less likely to be affected by vibration caused by any internal component of the HDD 10, for example. However, external vibration may enter the HDD 10 and affect positioning of the magnetic heads 45. In this regard, the HDD 10 of the present embodiment includes the damper 91 to be able to attenuate such external vibration, achieving more precise positioning of the magnetic heads 45.

The protector 18 covers the weld beads B at which the outer cover 17 is joined to the base 15. The smaller-thickness part 106 overlaps the protector 18 in the +Z direction. The larger-thickness part 105 is spaced from the protector 18 in a direction orthogonal to the +Z direction. The protector 18 also overlaps the outer cover 17. Because of this, the outer edge of the outer cover 17 is bent to approach the inner cover 16, to allow the +Z directional dimensions of the HDD 10 to be within one of the specified ranges defined in the SFF-8300 and to form the recess 75 in which the protector 18 is fitted. This makes it possible to increase the gap GW between the inner cover 16 and the outer cover 17 or the size of the inner space S at the location apart from the protector 18, for example. Meanwhile, the gap GN between the inner cover 16 and the outer cover 17 decreases at the location overlapping with the protector 18. However, the smaller-thickness part 106 can be disposed in the narrow gap GN between the inner cover 16 and the outer cover 17, allowing the constrained layer 101 to cover a wider area. In addition, being separated from the protector 18, the larger-thickness part 105 can be disposed in the wide gap GW between the inner cover 16 and the outer cover 17. As such, the HDD 10 according to the present embodiment can include the constrained layer 101 of a larger size despite the dimensional constraints of the HDD 10 according to various conditions, to be able to reduce vibration and noise by the damper 91.

The protector 18 has the upper wall 81. The upper wall 81 is attached to the outer cover 17 with the adhesive agent A1 to cover the outer cover 17. The smaller-thickness part 106 overlaps the upper wall 81 in the +Z direction. In the +Z direction, the difference L3 in thickness between the larger-thickness part 105 and the smaller-thickness part 106 is equal to or larger than the sum L2 of the thickness of the upper wall 81 and the thickness of the adhesive agent A1. The outer edge of the outer cover 17 is bent to approach the inner cover 16 along the difference in level between the larger-thickness part 105 and the smaller-thickness part 106, for example, forming the recess 75 in which the upper wall 81 of the protector 18 is fitted. In this case, the depth L1 of the recess 75 in the +Z direction is, generally, approximately equal to the difference L3 in thickness between the larger-thickness part 105 and the smaller-thickness part 106. Thus, the sum L2 of the thicknesses of the upper wall 81 fitted in the recess 75 and the adhesive agent A1 is equal to or less than the depth L1 of the recess 75. As such, the HDD 10 of the present embodiment can be avoided from exceeding one of the specifications regarding the +Z directional dimensions defined in the SFF-8300 due to the protector 18.

The protector 18 has the upper wall 81 attached to the outer cover 17 with the adhesive agent A1 to cover the outer cover 17. The smaller-thickness part 106 overlaps the upper wall 81 in the +Z direction. The outer cover 17 has the outer surface 71a at the +Z directional end. The outer cover 17 is provided with the recess 75 recessed from the outer surface 71a and in which the upper wall 81 is disposed. In the +Z direction, the depth L1 of the recess 75 is equal to or larger than the sum L2 of the thickness of the upper wall 81 and the thickness of the adhesive agent A1. As such, the HDD 10 of the present embodiment can be avoided from exceeding one of the specifications regarding the +Z directional dimensions defined in the SFF-8300 due to the protector 18.

The protector 18 covers the end of the outer cover 17 in the −Y direction orthogonal to the +Z direction. The smaller-thickness part 106 includes the first smaller-thickness part 107 and the second smaller-thickness part 108. The first smaller-thickness part 107 extends between the −Y directional end of the inner cover 16 and the larger-thickness part 105. The second smaller-thickness part 108 extends between the larger-thickness part 105 and the end of the inner cover 16 in the −X direction orthogonal to the +Z direction and orthogonal to the −Y direction. The first smaller-thickness part 107 overlaps the protector 18 in the +Z direction. The second smaller-thickness part 108 is spaced from the protector 18 in a direction orthogonal to the +Z direction. The first smaller-thickness part 107 is longer in length (width) in the −Y direction than the second smaller-thickness part 108 in the −X direction. Namely, the first smaller-thickness part 107 overlapping the protector 18 has a wider width while the second smaller-thickness part 108 not overlapping the protector 18 has a narrower width. As a result, the second smaller-thickness part 108 of the constrained layer 101 can be set to a minimum width, and the larger-thickness part 105 thereof can be set to a maximum width in the −X direction, for example. In this manner, the constrained layer 101 can be increased in thickness.

The magnetic head 45 reads and writes information from and to the magnetic disk 31. The magnetic head 45 is attached to the suspension 46. The suspension 46 is attached to the carriage 35. The VCM 34 includes the magnet 52 and rotates the carriage 35. The constrained layer 101 is magnetic. The magnet 52 overlaps the constrained layer 101 in the +Z direction. As a result, the constrained layer 101 can shield the magnetic flux generated from the magnet 52, to be able to prevent the magnetic flux from affecting, for example, other HDDs on the server rack, which would otherwise occur due to the leakage from the HDD 10.

The constrained layer 101 is made of ferromagnetic stainless steel. As a result, the smaller-thickness part 106 of the constrained layer 101 is relatively large in terms of rigidity and weight. Thus, the damper 91 can effectively attenuate vibration.

The magnet 52 has the two magnetic poles 52a and 52b and the boundary 52c between the two magnetic poles 52a and 52b. The boundary 52c overlaps the larger-thickness part 105 in the +Z direction. At the boundary 52c between the two magnetic poles 52a and 52b, magnetic flux exerts a unique property unlike each of the magnetic poles 52a and 52b. This may result in an increase in leakage of magnetic flux around the boundary 52c. In this regard, the larger-thickness part 105 can shield the magnetic flux more effectively than the smaller-thickness part 106 can. Because of this, the HDD 10 of the present embodiment can ensure that the magnetic flux leaking from the surroundings of the boundary 52c can be shielded.

The entire magnet 52 overlaps the constrained layer 101 in the +Z direction. As a result, the constrained layer 101 can more surely shield the magnetic flux generated from the magnet 52 to prevent the leakage of the magnetic flux from the HDD 10.

The base 15 and the outer cover 17 are made of an aluminum alloy, and the inner cover 16 is made of non-magnetic stainless steel, which are both non-magnetic materials.

Generally, the linear expansion coefficient of non-magnetic stainless steel, rather than magnetic stainless steel, is closer to the linear expansion coefficient of an aluminum alloy. The inner cover 16 is formed of non-magnetic stainless steel so that the housing 11 includes the base 15, the inner cover 16, and the outer cover 17 having similar linear expansion coefficients. Owing to such features, the components of the housing 11 are unlikely to exhibit different amounts of thermal expansion or thermal contraction at a time when a temperature change occurs. As a result, the HDD 10 can avoid warpage of the housing 11 due to the difference in amount of the thermal expansion or thermal contraction between the base 15 and the inner cover 16, for example.

The viscoelastic material 102 is interposed between the smaller-thickness part 106 and the inner cover 16 and is interposed between the larger-thickness part 105 and the inner cover 16. That is, the viscoelastic material 102 is provided in a wider range between the constrained layer 101 and the inner cover 16. Therefore, the damper 91 can effectively attenuate vibration.

The magnetic disks 31 overlap the constrained layer 111 of the damper 92 in the +Z direction. In the gap G between the inner cover 16 and the outer cover 17, a portion overlapping the magnetic disks 31 is wider than, for example, a portion overlapping the VCM 34. Therefore, the constrained layer 111 of the present embodiment has a larger area and thickness, therefore, heavier in weight. Thus, the HDD 10 of the present embodiment can reduce vibration and noise by the damper 92.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A disk device comprising:
a magnetic disk;
a base with an inner space in which the magnetic disk is disposed, the base including
   a bottom surface facing the magnetic disk,
   a side wall protruding in a first direction from the bottom surface, to surround the magnetic disk, and
   a support surface located at an end of the side wall in the first direction,
the inner space defined by the bottom surface and the side wall;
a first cover attached to the base to close the inner space;
a second cover being joined to the base while being supported by the support surface, to cover the first cover; and
a damper including
   a constrained layer in-between the first cover and the second cover, and
   a viscoelastic material interposed between the first cover and the constrained layer,
wherein the constrained layer includes:
a smaller-thickness part extending along the support surface, and
a larger-thickness part being thicker than the smaller-thickness part in the first direction and connected to the smaller-thickness part.

2. The disk device according to claim 1,
wherein the second cover is joined to the support surface.
3. The disk device according to claim 1,
wherein the magnetic disk overlaps the constrained layer in the first direction.
4. The disk device according to claim 1,
wherein the inner space is filled with a gas different from air.
5. The disk device according to claim 1, further comprising:
a third cover that covers a joint between the base and the second cover,
wherein the smaller-thickness part overlaps the third cover in the first direction, and
the larger-thickness part is spaced from the third cover in a direction orthogonal to the first direction.

6. The disk device according to claim 5, further comprising:
an adhesive agent,
wherein the third cover has a covering wall attached to the second cover with the adhesive agent, to cover the second cover,
the smaller-thickness part overlaps the covering wall in the first direction, and
in the first direction, a difference in thickness between the larger-thickness part and the smaller-thickness part is equal to or larger than a sum of a thickness of the covering wall and a thickness of the adhesive agent.

7. The disk device according to claim 5, further comprising:
an adhesive agent,
wherein the third cover has a covering wall attached to the second cover with the adhesive agent to cover the second cover,
the smaller-thickness part overlaps the covering wall in the first direction,
the second cover has an outer surface at an end in the first direction, and a recess being recessed from the outer surface, in which the covering wall is disposed, and
in the first direction, the recess has a depth equal to or larger than a sum of a thickness of the covering wall and a thickness of the adhesive agent.

8. The disk device according to claim 5,
wherein the third cover covers an end of the second cover in a second direction orthogonal to the first direction,
the smaller-thickness part includes:
   a first smaller-thickness part in-between an end of the first cover in the second direction and the larger-thickness part; and
   a second smaller-thickness part in-between an end of the first cover in a third direction and the larger-thickness part, the third direction being orthogonal to the first direction and the second direction,
the first smaller-thickness part overlaps the third cover in the first direction,
the second smaller-thickness part is spaced from the third cover in a direction orthogonal to the first direction, and
the first smaller-thickness part is longer in length in the second direction than the second smaller-thickness part in the third direction.

9. The disk device according to claim 1, further comprising:
a magnetic head that reads and writes information from and to the magnetic disk;
a suspension to which the magnetic head is attached;
a carriage to which the suspension is attached; and
an actuator including a magnet, the actuator being configured to rotate the carriage,
wherein the constrained layer is magnetic, and
the magnet overlaps the constrained layer in the first direction.

10. The disk device according to claim 9,
wherein the constrained layer is made of ferromagnetic stainless steel.
11. The disk device according to claim 9,
wherein the magnet includes two magnetic poles and a boundary between the two magnetic poles, and
the boundary overlaps the larger-thickness part in the first direction.
12. The disk device according to claim 9,
wherein the magnet entirely overlaps the constrained layer in the first direction.

13. The disk device according to claim 9, wherein the base and the second cover are non-magnetic.

14. The disk device according to claim 9, wherein the first cover is non-magnetic.

15. The disk device according to claim 1, wherein the viscoelastic material is interposed between the smaller-thickness part and the first cover and between the larger-thickness part and the first cover.

16. A disk device comprising:

a magnetic disk;

a base with an inner space in which the magnetic disk is disposed, the base including
- a bottom surface facing the magnetic disk, and
- a side wall protruding in a first direction from the bottom surface, to surround the magnetic disk, the inner space defined by the bottom surface and the side wall;

a first cover attached to the base to close the inner space;

a second cover being joined to the base, to cover the first cover; and a damper including
- a constrained layer in-between the first cover and the second cover, and
- a viscoelastic material interposed between the first cover and the constrained layer, wherein the constrained layer includes:

a larger-thickness part, and a smaller-thickness part being thinner than the larger-thickness part in the first direction, located between the larger-thickness part and a joint between the base and the second cover, and connected to the larger-thickness part.

\* \* \* \* \*